United States Patent [19]
Schlienger

[11] 3,769,441
[45] Oct. 30, 1973

[54] ARC ELECTRODE WITH DEFORMABLE DIFFUSER

[76] Inventor: Max P. Schlienger, 136 Mitchell Blvd., San Rafael, Calif. 94903

[22] Filed: Dec. 6, 1972

[21] Appl. No.: 312,453

[52] U.S. Cl. .................................................. 13/18
[51] Int. Cl. ............................................. H05b 7/08
[58] Field of Search ............................... 13/9, 18

[56] References Cited
UNITED STATES PATENTS
| | | | |
|---|---|---|---|
| 3,368,018 | 2/1968 | De Corso et al. | 13/18 |
| 3,476,861 | 11/1969 | Wolf | 13/18 |

Primary Examiner—Roy N. Envall, Jr.
Attorney—Stephen S. Townsend et al.

[57] ABSTRACT

An arc electrode with a deformable coolant fluid diffuser. The diffuser has a generally cylindrical shape with an involute tip end and a plurality of projections extending from the outer surface. The projections cooperate with the inner wall surface of the electrode to provide a number of coolant fluid passageways. The malleable structure of the diffuser prevents restriction of the passageways and stress induced cracking of the electrode tip as the electrode is subjected to thermally induced deformations.

12 Claims, 6 Drawing Figures

PATENTED OCT 30 1973 3,769,441
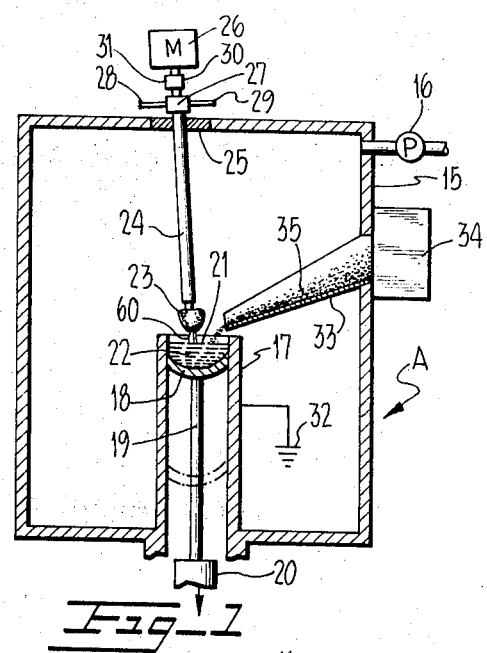
Fig_1
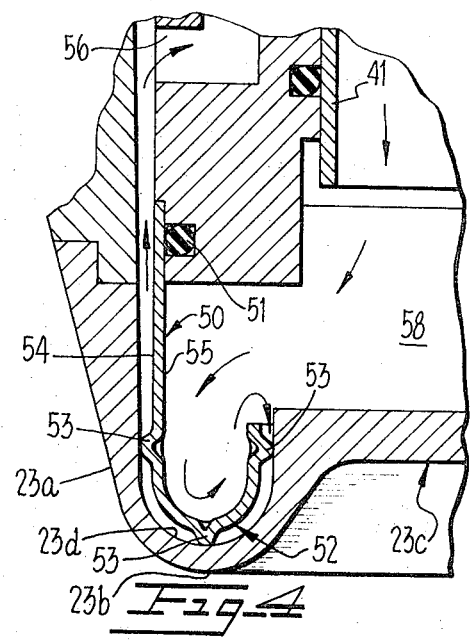
Fig_4
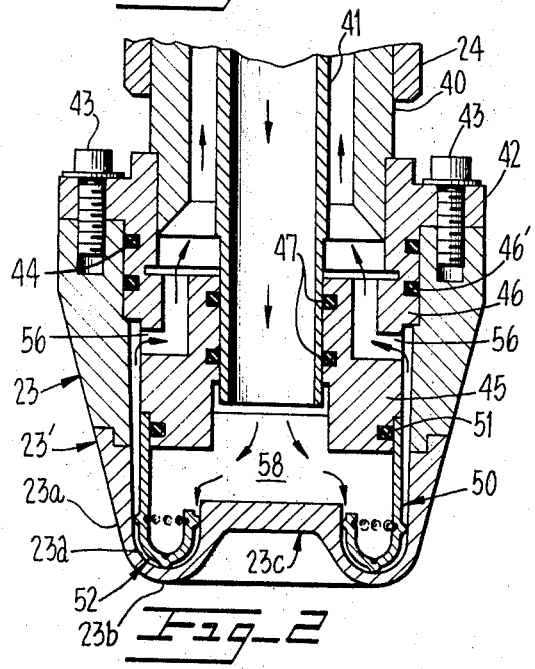
Fig_2
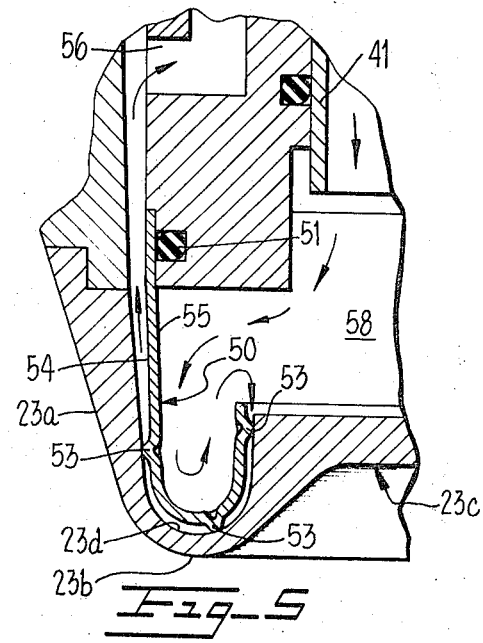
Fig_5
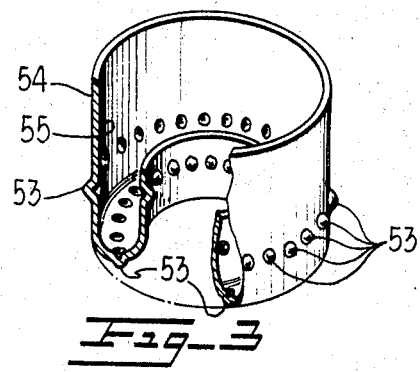
Fig_3
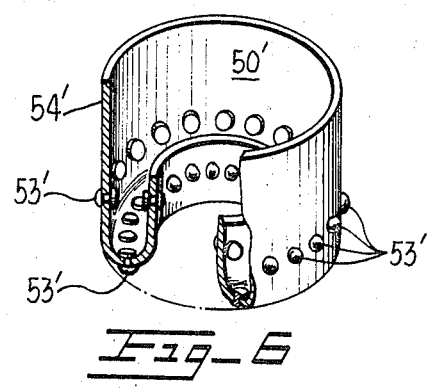
Fig_6

ARC ELECTRODE WITH DEFORMABLE DIFFUSER

FIELD OF THE INVENTION

This invention relates to a non-consumable arc generating device for use in an arc furnace. More particularly, this invention relates to a non-consumable arc electrode having a coolant fluid system for maintaining the temperature of the electrode within a workable range.

DESCRIPTION OF THE PRIOR ART

Arc furnaces generally incorporate a melt and an electrode which is arranged to establish an arc to the melt in order to create a sufficient temperature gradient to melt the materials within an evacuated or controlled atmosphere chamber. In known devices, such as that disclosed in the applicant's U.S. Pat. No. 3,649,733 issued Mar. 14, 1972, a non-consumable arc wheel is employed as the arc electrode. This wheel is rotated at a predetermined speed and attitude so that arcs originate from changing portions of the tip surface of the rotating electrode. In a typical electrode of this type, a cooling system employing a suitable fluid, e.g. water, is provided for maintaining the arc electrode at a sufficiently low temperature to allow high temperature arc melting to occur without electrode destruction.

In typical prior art arc electrode cooling systems, such as that disclosed in the above-noted patent, a rotatable electrode is formed with a hollow interior into which a stream of coolant fluid is introduced by means of a suitable fluid inlet fixture. A rigid baffle is positioned in the electrode interior in order to define one or more fluid passageways along which the coolant fluid may flow toward a fluid outlet. As the fluid flows along these passageways, it encounters the inner wall surfaces of the electrode and conducts away portions of the thermal energy resulting from the arc melt process. The coolant fluid is then cooled and recycled into the electrode interior.

While this arrangement has been found to function in a satisfactory manner in many applications, it has been observed that under some operating conditions during a given thermal cycle the rotating electrode is subjected to widely varying thermal gradients across the wall thickness from the outer surface portion to the inner surface portion. For example, at the high point of a thermal cycle, when the outer surface of the electrode tip is operating as the arc generating surface, and the corresponding inner surface is being cooled by direct contact with the circulating collant fluid, the outer surface experiences an extremely high temperature while the inner surface experiences a relatively low temperature, thereby establishing an extremely high temperature differential across the corresponding wall thickness. After the electrode has cooled after termination of an arc melt operation, on the other hand, the temperature differential across the same wall thickness is essentially zero. Thus, during one thermal cycle of the electrode, the tip portion under discussion is subjected to widely varying temperature differentials. These widely varying temperature differentials result in corresponding widely varying thermal Stresses which cause the electrode tip to undergo radical deformation. This deformation is compounded during several thermal cycles to such an extent that one or more of the necessary coolant fluid passageways may become severely restricted, thereby reducing the cooling efficiency of the system. In extreme cases, fluid passageways have been observed to become completely blocked, resulting in severe damage to or complete destruction of the electrode.

Attempts to alleviate the above noted problems have centered around designing massive, rigid baffles capable of resisting this thermally induced structural deformation of the electrode. Such baffles, however, have not been succesful in eliminating restriction of the fluid passageways and, by virtue of their rigid nature, have additionally been found to cause stress induced cracking of the electrode at points of high stress, thereby rendering the electrode completely unusable.

SUMMARY OF THE INVENTION

The invention comprises a deformable diffuser which is capable of providing accurately positioned coolant fluid passageways adjacent to the inner surface of an arc electrode and maintaining the passageways unrestricted as portions of the electrode are deformed by thermal stresses. In a preferred embodiment, the invention comprises a hollow member having a plurality of projections extending from the surface of the main body portion toward the inner surface of the tip end of the electrode. The tip end of the diffuser has an involute shape for providing stress relief when the diffuser is subjected to compressive forces due to thermally induced deformations of the electrode.

Diffusers constructed according to the invention have been found to provide unrestricted fluid coolant passageways over a wide range of thermal gradients across the electrode wall while offering negligible mechanical resistance to deformation of the electrode wall, thereby eliminating the problem of stress induced cracking of the electrode during thermal cycling. In addition, since diffusers constructed in accordance with the invention are lighter and less expensive to manufacture than known devices, an expended diffuser may be readily discarded and replaced with a new diffuser when the electrode tip is replaced.

For a fuller understanding of the nature and advantages of the invention, reference should be had to the following detailed description taken in conjunction with the accompanying drawing.

BRIEF DESCRIPTION OF THE DRAWINGS

FIG. 1 is a diagrammatic view showing an arc furnace incorporating a preferred embodiment of the invention;

FIG. 2 is a cross-sectional enlarged view of the preferred embodiment of the invention;

FIG. 3 is a perspective view partially in section of the deformable diffuser;

FIG. 4 is an enlarged cross-sectional view taken from FIG. 2 showing a portion of the electrode in a normal state;

FIG. 5 is an enlarged cross-sectional view similar to FIG. 3 showing the electrode in a highly deformed state; and FIG. 6 is a perspective view partially in section of an alternate embodiment of the deformable diffuser.

DESCRIPTION OF THE PREFERRED EMBODIMENT

Turning now to the drawings, FIG. 1 shows an arc furnace A formed with an enclosure or housing 15 and having an evacuation pump mechanism 16 adapted to withdraw gas from the housing. By this means, the interior of housing 15 can be maintained under vacuum or protective atmosphere conditions, the exact pressure of which is determined by the materials to be worked on and the proposed purpose for their treatment.

A crucible cylinder 17 is vertically mounted in the interior of housing 15. A crucible bottom 18 is reciprocally mounted within cylinder 17. The crucible bottom 18 is supported by a shaft 19 and is drawn downwardly by a propulsion device 20 on demand. Thus, the upper surface 21 of melt 22 within crucible 17 can be maintained at a desired level simply by raising and lowering crucible bottom 18 by the propulsion device 20. As additional materials are fed into melt 22 the crucible bottom 18 is accordingly lowered, thereby holding the upper surface 21 of melt 22 in its requisite position. The aforesaid melt-forming structure is common in the art and is illustrated in the present form for illustrative purposes only, it being understood that the invention can be combined with other forms of work supporting devices.

Mounted over melt 22 is an electrode wheel 23. Electrode wheel 23 is attached to a shaft 24, which is pivotally mounted in a bearing 25. Suitable mounting structure of this type is disclosed in applicant's U.S. Pat. No. 3,651,238 entitled "Arc Furnace Electrode Wheel Mounting System," issued Mar. 21, 1972. Bearing 25 serves to support shaft 24 while electrically insulating shaft 24 from the housing 15. Shaft 24 extends through bearing 25 to the exterior of the housing 15. Shaft 24 is therein driven by a motor 26 mounted on the external end of the shaft. Thus, movement of the motor 26 causes rotation of shaft 24 and concurrent rotation of electrode wheel 23.

Water or other fluid coolant is transmitted to, and exited from, electrode wheel 23 through a fluid or water intake manifold 27 mounted on shaft 24 externally of housing 15. The fluid is introduced into an inlet pipe 28 which is directed through manifold 27 into fluid communication through shaft 24 with electrode wheel 23. The fluid is exhausted through shaft 24, manifold 27 and an exhaust pipe 29. The water or other fluid supply system for handling the entry and exit at conduits 28 and 29, as well as motor 26, are maintained in electrical isolation from housing 15.

A source of high-energy electrical power is provided at electrical terminal 30 and is connected by a coupling 31 to shaft 24 for transfer of the electrical energy to the conductive body of electrode wheel 23. The opposite pole of the aforesaid electrical energy is connected by ground 32 to cylinder 27 apparent, this establishes a high-energy potential difference between the electrode wheel 23 and the crucible 18.

Materials to be melted can be fed into melt 22 by conventional means. One illustration of such a means is shown in FIG. 1, in which materials are fed to a chute 33 through an airlock mechanism 34. The termination of the chute 33 is arranged to drop work material, shown at 35 into crucible 17.

Referring to FIG. 2, the structure of electrode wheel 23 will now be described in detail. Shaft 24 includes a fluid outlet pipe 40, and a fluid inlet pipe 41 concentrically disposed within outlet pipe 40. Outlet pipe 40 is rotationally attached to shaft 24, while inlet pipe 41 is fixedly mounted to fluid coupling 27, so that pipe 41 remains in a stationary position when shaft 24 is rotated.

A mounting flange 42 is attached to the end of outlet pipe 40. Electrode wheel 23 is secured to mounting flange 42 by a plurality of bolts 43. An O-ring or other suitable seal 44 is provided between flange 42 and electrode wheel 23, to make this attachment fluidtight, thereby reventing the leakage of coolant fluid from the interior of the electrode wheel 23.

Electrode wheel 23 includes a tip portion 23' which is brazed or otherwise attached to electrode wheel 23 to permit replacement of the tip portion 23' if this should be necessitated due to excessive distortion or erosion of the arc forming surface thereof. Electrode wheel 23 includes a sidewall portion 23a and a lower face portion 23b. Lower face portion 23b of electrod tip portion 23' includes a recessed central hub portion 23c, which cooperates with sidewall portion 23a to define an annular groove having a wall surface 23d. Electrode wheel 23 is positioned over the melt 22 so that the annular protuberant periphery or lower face portion 23b thereof is in arc forming proximity with the upper surface 21 of melt 22. (See FIG. 1).

Disposed within the electrode wheel 23 is a spacer member 45 which provides support for a deformable diffuser 50, described below. Spacer member 45 is secured within electrode wheel 23 by engagement of a lip portion 46 thereof with a suitable recess in the interior of electrode wheel 23. An O-ring 46' or other suitable seal is provided between lip portion 46 of spacer member 45 and mounting flange 42, to further mimimize the possibility of coolant fluid leakage. The interior of spacer member 45 is slippingly engaged over the end of inlet pipe 41, so that rotation of shaft 24 will cause spacer member 45 to rotate concurrently therewith, the inner surface thereof rotating about inlet pipe 41. A pair of O-rings or other suitable seals 47 are disposed between spacer member 45 and inlet pipe 41 to provide coolant fluid lubricated bearings for the rotation of spacer member 45 on inlet pipe 41.

Disposed about the lower outer periphery of spacer member 45 in a slip fit is a deformable diffuser 50. An O-ring or equivalent seal is disposed between the inner surface of the upper end of diffuser 50 and the periphery of spacer member 45 to provide a fluid-tight seal. Alternatively, diffuser 50 may be attached to spacer member 45 by shrink fitting, brazing or threading in a fluid-tight manner. The electrode tip end 52 of deformable diffuser 50 is formed in an involute shape, which conforms generally with the shape of wall surface 23d.

As best seen in FIGS. 3–6, deformable diffuser 50 is provided with a plurality of projections 53 extending from the outer surface 54 thereof. Projections 53 contact wall surface 23d of electrode tip 23a and are arranged to define a plurality of coolant fluid passageways, together with inner wall surface 23d and outer wall surface 54. In the embodiment shown In FIGS. 3–5 projections 53 have a conical shape with rounded points. FIG. 6 shows an alternate embodiment 50' in which the projections comprise a number of rivets 53' extending outwardly from wall surface 54'. Other equally suitable configurations will occur to those skilled in the art. The actual arrangement of projections 53 and the dimensions of the coolant fluid passageways may best be determined for any given application in an empirical manner.

Deformable diffuser 50 may be constructed by any one of a number of known methods, preferably by spinning a thin tube having projections 53 thereon and forming involute end 52 with a suitable tool. Alternatively, diffuser 50 may be stretch formed in a press. Diffuser 50 may be constructed from a wide variety of malleable materials — such as copper, brass, aluminum, stainless steel or the like — which provide a deformable involute end portion 52.

With reference to FIG. 2, spacer member 45 includes a plurality of passageways 56 which define an outlet portion for permitting coolant fluid to flow from electrode wheel 23 via the annular space between inlet pipe 41 and outlet pipe 40 to exhaust pipe 29, whence the fluid may be cooled and recycled by means not shown.

In operation, work material 35 is fed into crucible 18 of arc furnace A through the airlock valve 34. Pump 16 is actuated to maintain the interior of housing 15 at an appropriate vacuum. Motor 26 is energized to rotate electrode wheel 23 at a speed sufficient to prevent the accumulation of the melt material deposited on the side wall portion 23a of electrode wheel 23 due to vacuum deposition or sputtering.

Electrical energy is applied at terminal 30 and ground 32 at sufficient intensity to cause one or more arcs 60 to be developed from a small area on the lower face portion 23b of electrode wheel 23 to the top or upper surface 21 of melt 22. This, in turn, causes vacuum deposition and sputtering of melt material on electrode wheel 23. However, the rotation of electrode wheel 23 imparts sufficient centrifugal force to the vaporized or sputtered material deposited on the side wall portion 23a of electrode wheel 23 to cause such material to be thrown off, thereby preventing the accumulation of such material on the side walls of the electrode wheel.

The rotation of electrode wheel 23 continually changes the area of lower face portion 23b of the wheel from which arc 60 emanates. Thus, as electrode wheel 23 rotates, an arc is formed from only a few degrees of the lower face portion 23b thereof, while the entire lower face portion 23b is being cooled by the flow of coolant fluid through the interior of electrode wheel 23. The flow of coolant fluid thus maintains electrode tip 23' below a temperature at which premature destruction would normally occur. Upon termination of the arc melt process, tip 23' is cooled to ambient tmperature by continued circulation of the coolant fluid. Alternatively, in some applications, tip 23' may be permitted to cool without further circulation of the coolant fluid after termination of the arc melt process.

Although the fluid coolant system maintains electrode tip 23' below a destructive temperature, during the arc melt process a thermal gradient is established across the wall thickness of electrode tip 23'. This thermal gradient can cause the tip 23' to undergo physical deformation. However, due to the provision of deformable diffuser 50, deformation of electrode tip 23' neither impairs the flow of coolant fluid through the interior of electrode wheel 23 nor results in stress induced cracking of this element.

The operation of deformable diffuser 50 during thermal cycling of electrode wheel 23 is bust understood by reference to FIGS. 4 and 5. FIG. 4 shows an enlarged partial section of electrode tip 23' in the normal state. As is evident from this FIG., involute tip end 52 is nestled in the annular groove in electrode tip 23' projections 53 in contact with inner wall surface 23d. In this normal state, coolant fluid flows in the direction indicated by the arrows along inlet pipe 41, into a chamber 58 formed by the inner surfaces of central hub portion 23c, spacer member 45 and deformable diffuser 50, along the coolant fluid passageways and out through exhaust pipe 40. FIG. 5 shows the same portion of tip 23' in a highly deformed state in which the cross-sectional area of the annular groove has contracted severely. As is evident from this FIG., due to the malleable construction of deformable diffuser 50, contraction of the area of the annular groove merely causes involute tip end 52 of diffuser 50 to deform along inner wall surface 23d. It will be noted that any compressive forces on deformable diffuser 50 are relieved by the deformation of involute tip end 52. It is important to note that the pressure of incoming coolant fluid on the inner surface 55 of the deformable diffuser 50 provides a force tending to maintain the extended surface of each projection 53 in contact with the inner wall surface 23d of tip 23'. Thus, even in the deformed state, projections 53 maintain substantially the same spacing between outer surface 54 of diffuser 50 and inner fluid to continue to flow at an unaltered rate.

Electrode wheels provided with a deformable diffuser constructed in accordance with the invention disclosed above have been found to possess cooling characteristics which are far superior to prior art devices. Due to the improved cooling characteristics, and the absence of rigid structure tending to promote stress-induced cracking, electrodes constructed according to the teachings of the invention enjoy prolonged useful life over known devices.

While the above provides a full and complete disclosure of the preferred embodiment of the invention, various modifications, alternate constructions and equivalents may be employed, without departing from the true spirit and scope of the invention. Therefore, the above description and illustrations should not be construed as limiting the scope of the invention which is solely defined by the appended claims.

What is claimed is:

1. A fluid cooled, non-consutuble arc electrode comprising a housing having an enclosed tip end subject to thermal stress deformations, said tip end having an inner surface, coolant fluid inlet means for supplying coolant fluid to the interior of said housing, coolant fluid outlet means for enabling said coolant fluid to flow from said housing interior, and a coolant fluid diffuser for directing the flow of coolant fluid from said inlet to said outlet past selected portions of said inner surface, said diffuser including a deformable hollow body portion and a plurality of projections extending from the surface of said body portion toward said inner surface of said tip end, said projections being arranged to provide a plurality of coolant fluid passageways, said deformable body portion providing a yieldable structure for preventing restriction of said flow passageways when said selected tip and is subjected to said thermal stress deformations.

2. The apparatus of claim 1 wherein the surface area of said diffuser provides a pressure differential in cooperation with said coolant fluid for maintaining said projections in contact with said inner surface of said tip end so that the spacing between said diffuser and said inner surface is substantially constant over the range of said thermal stress deformations.

3. The apparatus of claim 1 wherein said diffuser has a generally cylindrical configuration with an involute end portion and said projections are located along the outer surface of said end portion.

4. The apparatus of claim 1 wherein each of said projections has a conical shape.

5. The apparatus of claim 1 wherein each of said projections comprise a rivet.

6. The apparatus of claim 1 further including a support member having a central bore disposed about said inlet means in fluid-tight relation therewith and an outer peripheral portion in fluid-tight relation with the inner periphery of said diffuser.

7. The apparatus of claim 1 further including means for rotating said arc electrode about the axis thereof.

8. The apparatus of claim 3 wherein said tip end has an inner surface with a central inwardly projecting boss and an annular groove, and said involute end portion of said diffuser is disposed adjacent said annular groove with said projections normally in contact with the surface of said groove.

9. For use in an arc generating device having a fluid cooled non-consumable electrode subject to thermal stress deformations, a coolant fluid diffuser having a deformable body portion, and a plurality of projections extending from said body portion for providing coolant fluid flow passages adjacent selected surface portions of said electrode, said deformable body portion providing a yieldable structure for preventing restriction of said flow passages when said electrode surface portions are subjected to said thermal stress deformations.

10. The apparatus of claim 9 wherein said diffuser has a generally cylindrical configuration with an involute end portion, and said projections are located along the outer surface of said involute end portion.

11. The apparatus of claim 9 wherein each of said projections has a conical shape.

12. The apparatus of claim 9 wherein each of said projections comprises a rivet.

* * * * *